(12) United States Patent
Li et al.

(10) Patent No.: US 7,237,907 B2
(45) Date of Patent: Jul. 3, 2007

(54) PROJECTION SYSTEM THAT ADJUSTS FOR KEYSTONING

(75) Inventors: Baoxin Li, Vancouver, WA (US);
Shigeru Kojima, Tochigi Pref. (JP);
Toshinori Furuhashi, Tochigi Pref. (JP);
Kazuya Arakawa, Tochigi Pref. (JP);
Ryohichi Yonezawa, Tochigi Pref. (JP)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 11/642,608

(22) Filed: Dec. 19, 2006

(65) Prior Publication Data

US 2007/0097328 A1    May 3, 2007

Related U.S. Application Data

(62) Division of application No. 10/630,823, filed on Jul. 29, 2003, now Pat. No. 7,175,285.

(51) Int. Cl.
*G03B 21/14* (2006.01)
*H04N 3/23* (2006.01)

(52) U.S. Cl. .................. 353/70; 353/121; 348/747
(58) Field of Classification Search .............. 353/69, 353/70, 28, 42, 122, 121, 94; 348/745–747, 348/806
See application file for complete search history.

(56) References Cited

U.S. PATENT DOCUMENTS

| | | | |
|---|---|---|---|
| 2002/0021418 A1* | 2/2002 | Raskar | 353/69 |
| 2003/0210381 A1* | 11/2003 | Itaki | 353/70 |
| 2004/0061838 A1* | 4/2004 | Mochizuki et al. | 353/69 |

* cited by examiner

*Primary Examiner*—W B Perkey
*Assistant Examiner*—Andrew Sever
(74) *Attorney, Agent, or Firm*—Chernoff, Vilhauer McClung & Stenzel

(57) ABSTRACT

A system for adjusting keystoning in a projector may include sensing using an imaging device at least two boundaries defining a projection screen and determining a transformation to adjust the keystoning of an image projected from the projector. The image may be modified from the projector in accordance with the transformation and projecting the modified image from the projector, wherein the imaging device and the projector are maintained in a fixed relationship with respect to each other.

5 Claims, 10 Drawing Sheets

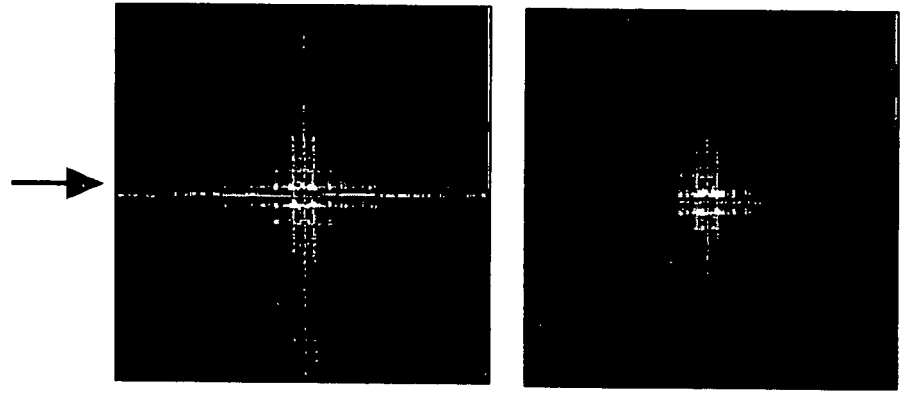
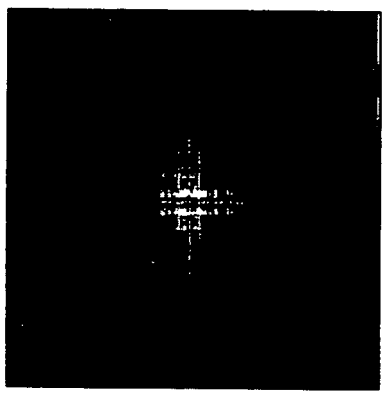
FIG. 8　　FIG. 7
Spectrum　　Spectrum
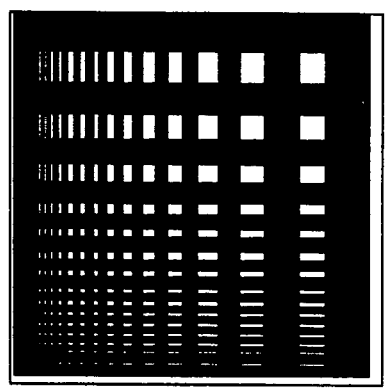
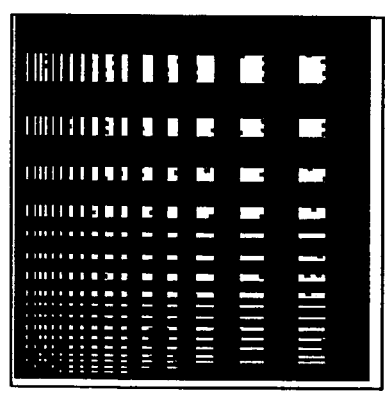
FIG. 5　　FIG. 6
Focused Image　　Out-of-focus Image (b)

An image of the screen from the projector's perspective. The line is assumed to be the one row that the 1-D sensor can sense.

(b)

The luminance values of the row in (a), illustrating that working in the luminance domain there may be no region that is uniform (and thus is potential screen area).

(c)

The gradient of (b).

Based on the similarity of the triangles, the distance L is computed as a function of the sensor parameters ($B$ and $f$) and the disparity $\Delta X$ (difference between the two images of the same physical point):

$$L = \frac{Bf}{\Delta X}$$

PROJECTION SYSTEM THAT ADJUSTS FOR KEYSTONING

CROSS-REFERENCE TO RELATED APPLICATIONS

This application is a division of U.S. patent application Ser. No. 10/630,823, filed Jul. 29, 2003 now U.S. Pat. No. 7,175,285.

BACKGROUND OF THE INVENTION

This invention relates generally to image projectors, and more particularly, to modifying projected images.

Portable digital image projectors are common. Such digital image projectors, while connected to a personal computer or other image/video source, sit on a surface and are directed at a projection surface to show a "slide" presentation or a video presentation. Many of these projectors use transmissive or reflective liquid crystal displays, and typically only have a single main lens. Other such projectors use different imaging devices, such as digital micro-mirrors, and may include more than one lens. The projectors can display images one at the time or as a sequence of images, as in the case of video.

These digital projectors are typically designed so that undistorted rectangular images are projected on the projection surface when the projector is placed horizontally on a level support surface with the projector's optical axis lined up perpendicular to the projection surface. However, if the alignment and orientation is modified, then the resulting image on the projection surface may be distorted. In many cases the image will appear as a trapezoid, and in other cases an arbitrarily shaped quadrilateral. The non-rectangular shape of the resulting projected image is referred to as keystoning.

One technique to adjust for keystoning is to tediously adjust the physical position of the projector by moving it around, tilting and rotating it, until a near rectangular image is displayed. However, in many situations, it may not be feasible to sufficiently physically adjust the position of the projector. For example, the projector may need to be positioned above or below the display surface for proper image presentation.

U.S. Pat. No. 5,548,357, entitled "Keystoning and focus correction for an overhead projector," describes a system where a test slide is displayed. A user then identifies line pairs that appear to be parallel to each other. The user identified line pair activates a distortion correction program that uses the oblique angle between the horizontal plane through the projector and the viewing screen. This is a burdensome task for a user to correctly perform.

U.S. Pat. No. 5,795,046, entitled "Method for pre-compensating an asymmetrical picture in a projection system for displaying a picture," describe a system where the projection angle, and the trapezoidal error, is compensated for by the user entering positional information into the system via a keyboard. The determination and inputting of positional information is difficult and burdensome for the user.

U.S. patent Publication 2002/0021418 A1, entitled "Automatic Keystone Correction For Projectors With Arbitrary Orientation", describes a projection system that includes a pair of tilt sensors and a camera. The system using data from the tilt sensors and the camera warps the projected image to display an image that is rectangular. Unfortunately, the tilt sensors tend to be expensive and the system requires complex re-calibration when the projector lens moves, e.g., when the projector is zoomed and/or focused. This inherent complexity increases the expense of the resulting projector.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 5 shows a focused image.
FIG. 6 shows an out of focus image.
FIG. 7 shows the spectrum of FIG. 6.
FIG. 8 shows the spectrum of FIG. 5.

DETAILED DESCRIPTION OF PREFERRED EMBODIMENT

Figure 1:
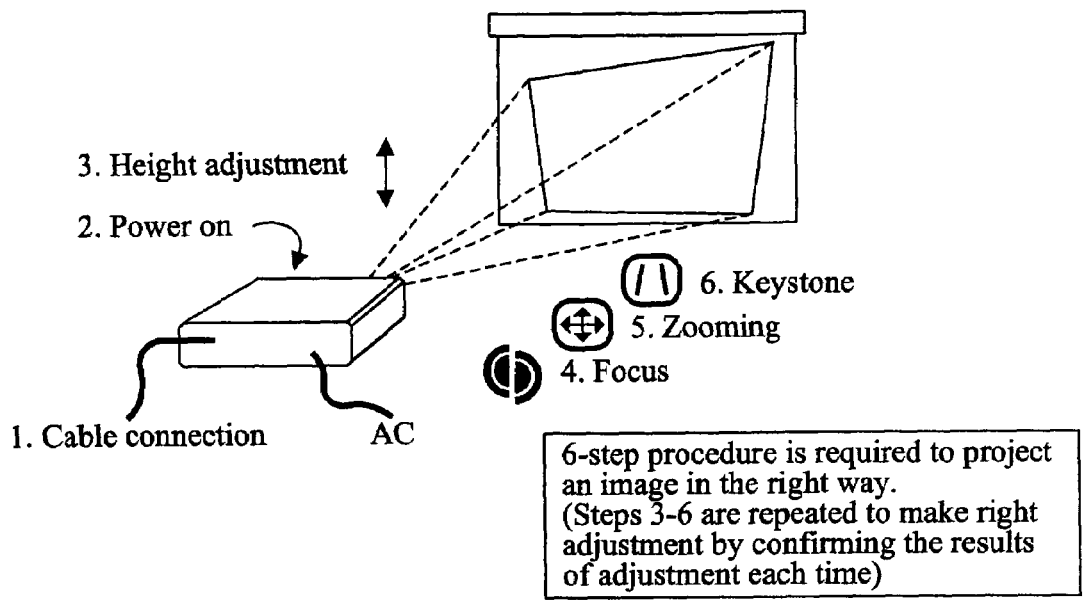
FIG. 1 is an existing projection system.

Referring to FIG. 1, a typical projection system includes an enclosure housing the electronics and imaging devices. To set up a projector to display an image properly many steps are performed which typically include, (1) connecting a cable to a laptop or other image source, (2) switching a power switch (on/off), (3) adjusting the vertical angle of projection, (4) focusing the image on the display, (5) adjusting the zoom of the image, and (6) manually adjusting the keystone. As it may be observed, this includes many steps which typically need to be performed in a suitable order.

Figure 2:
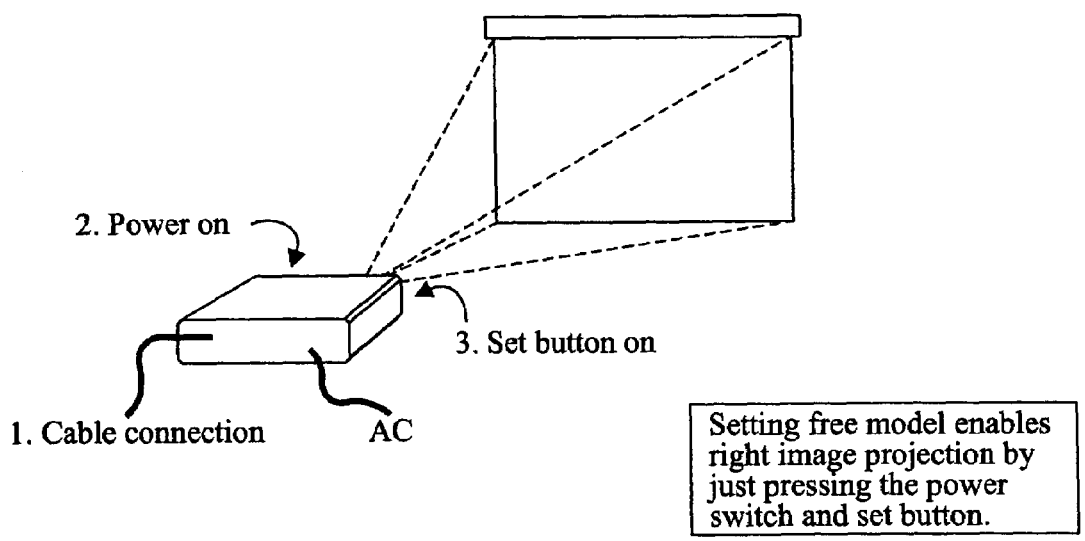
FIG. 2 is a modified projection system.

Referring to FIG. 2, a modified projection system includes an enclosure housing the electronics and imaging devices. To set up the modified projector to display an image properly fewer steps are performed which typically include, (1) connecting a cable to a laptop or other image source, (2) switching a power switch (on/off), and (3) selecting the auto-set up function. As it may be observed this requires considerably fewer operations and is less likely to be performed in an improper manner.

Figure 3:
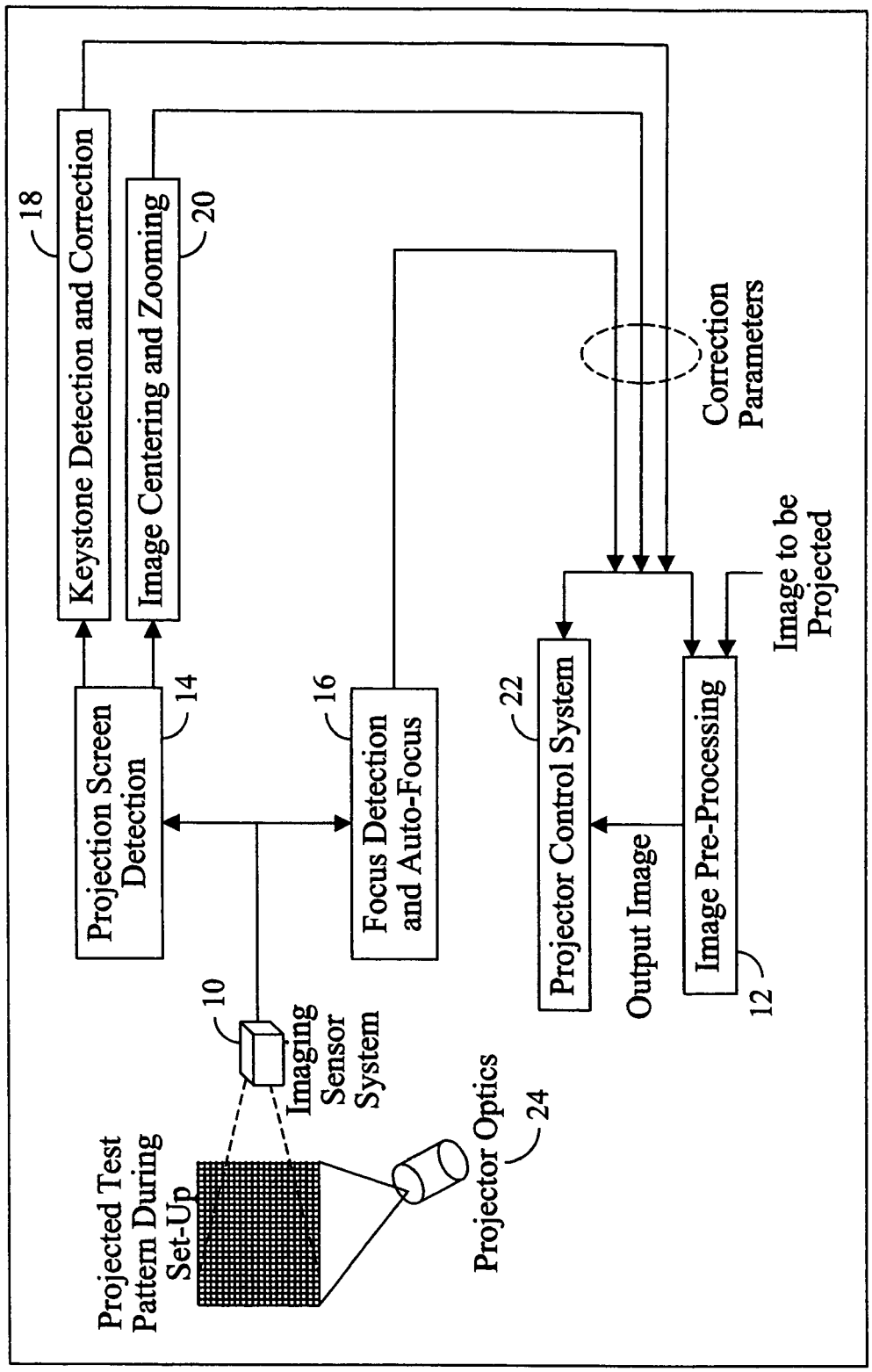
FIG. 3 illustrates a self adjusting projection system.

Referring to FIG. 3, the primary components of a self-adjusting (setting-free) projector include an imaging sensor system 10, an image pre-processing module 12, projection screen detection module 14, focus detection and auto-focus module 16, keystone detection and correction module 18, image centering and zooming module 20, projector control system 22, and projector optical and mechanical components 24.

The imaging sensor system 10 may contain one or more imaging sensors, or imaging sensor pairs forming a stereo pair. Individual imaging sensors may be one-dimensional or two-dimensional sensors. The imaging sensors may also include the projector optics, such as the projection lens. In the case of a pair of sensors, the relative angular deviation between the surface onto which the image is projected and the image plane of the projector may be used as the basis of image modification, such as keystoning. It is noted that a vertical tilt sensor may be included, if desired.

Figure 4:
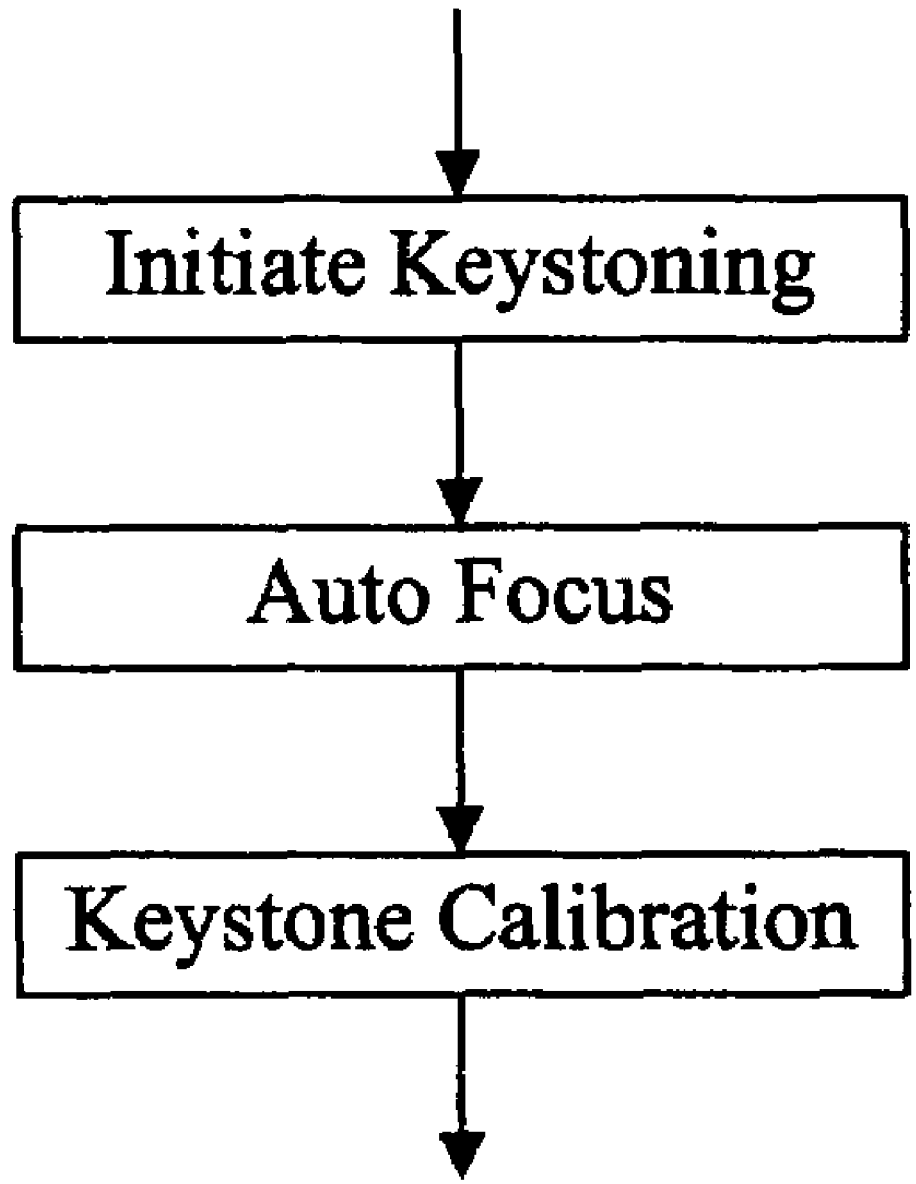
FIG. 4 illustrates keystone correction with autofocus.

The present inventors considered the projector system of U.S. patent Publication 2002/0021418 A1, entitled "Automatic Keystone Correction For Projectors With Arbitrary Orientation", described above, and determined that occasionally the projector system will fail to properly keystone compensate. After considering the inability to properly keystone compensate the present inventors came to the realization that such a potential failure is, at least in part, the result of the projector being sufficiently out of focus. In many cases, the user will tend to manually focus the projector prior to keystoning which will alleviate the concern. However, in other cases the user will consider the projector sufficiently focused for their current needs and will attempt to keystone correct the image without success, thus resulting in frustration to the user. Referring to FIG. 4, to overcome this previously unconsidered limitation, the system preferably auto-focuses prior to keystone correction. While any number of different auto-focus mechanisms may be used, the system preferably uses an appropriate test pattern to determine whether or not the projector is in focus (see FIG. 5). In the event the system is not properly focused (see FIG. 6), an iterative process where the amount of de-focus is determined, the lens is focused, the amount of de-focus is determined, the lens is focused, etc. is undertaken. One technique for determining the amount of de-focus is to use the frequency spectrum of the image of the projected test pattern (see FIG. 7) and compare it with a reference frequency spectrum (see FIG. 8) of the image of the test pattern acquired when the projector is properly focused. Other de-focus (or focus) detection, determination, and adjustment mechanisms may likewise be utilized, as desired. After performing an auto-focus of the projection system, then the system applies a keystone compensation.

In one embodiment, the keystone compensation may be manually performed by the user after automatic auto focus. In another embodiment, the keystone compensation may be automatically performed by the system after automatic auto focus. In yet another embodiment, the keystone compensation may be partially manual and partially automatically performed after automatic auto focus. The auto-focus function should be invoked by the system as a result of activating or otherwise performing the keystone compensation. The activation of the auto-focus function, as applied to keystone compensation, should be in a manner free from separate user selection of the otherwise existing auto-focus function of the projector. In this manner, the focus of the system is ensured prior to completion of the keystone correction.

The present inventors further considered the projector system described in R. Sukthankar et al., "Smarter Presentations: Exploiting Homography In Camera-Projector Systems," IEEE ICCV Conference, 2001, described above, and determined that while the use of the single camera can be used to estimate the parameters of the keystone effect, however, there is no guarantee that the projected image after keystone correction maintains the correct aspect ratio. In particular, the system needs to compute C. This is performed by detecting the four screen corners in the image domain, the four physical screen corners, and then solve for C. Unless the physical screen happens to have the same aspect ratio as the screen the system cannot obtain the correct aspect ratio. To overcome such a limitation the present inventors determined that interactivity with the user and the projection system can overcome such aspect ratio limitations.

Figure 9:
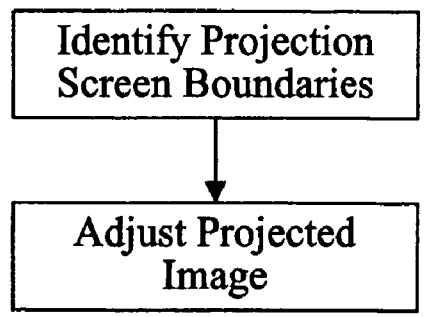
FIG. 9 illustrates image adjustment in accordance with screen size.

Referring to FIG. 9, the corners of the projection screen may be identified, such as the upper left corner, the upper right corner, the lower left corner, and the lower right corner. With all four corners identified, or at least a pair of diagonal corners identified, the aspect ratio of the projection screen may be determined. Alternatively, the system could detect the edges of the projection screen and from that determine the general boundaries of the projection screen. In any case, the identification of one or more aspects of the projection screen indicating a region that is suitable for displaying an image on, or otherwise the exterior boundary of the projection screen, will be referred to as a boundary. In many cases, the aspect ratio of the projection screen is similar to the desired aspect ratio of the projected image. In some cases, only the upper or lower corners of the projection screen are detected, in which case, the width of the projection screen may be used as the basis to predict a typical aspect ratio of the screen, such as a 4:3 aspect ratio. In a similar manner, the vertical edges of the projection screen may likewise be used. In some cases, only the right or left corners of the projection screen are detected, in which case, the height of the projection screen may be used as the basis to predict a typical aspect ratio of the screen, such as a 4:3 aspect ratio. In a similar manner, the horizontal edges of the projection screen may likewise be used.

The projected image, such as using a test pattern, is sensed by the camera and compared with the size of the projection screen. This may be done by comparing the four corners of the projected test pattern with the four corners (or otherwise) of the detected projection screen. Then, adjustments to the projected image may be made to shift the edges of the projected image in accordance with the projection screen. The sensing of the projected image by the camera and resizing the projected image may be repeated until the desired size (horizontal and/or vertical) and/or aspect ratio of the projected image is achieved. For example, if the projection is to the left of the screen, the screen detection module may sense such an alignment and output a set of control parameters to cause the projector to shift towards the right-hand side. In one embodiment, the control parameters may be the distance between the mass centers of the projection screen and the projected image. The system may use any suitable relationship between the projected image and the size of the projection screen. For example, the image may be centered on the projection screen and sized to fit approximately 90% of the projection screen. For example, if the projection is larger than the detected screen, then the projector may zoom in; and if the projection is smaller than the detected screen, then the projector may zoom out.

Figure 10:
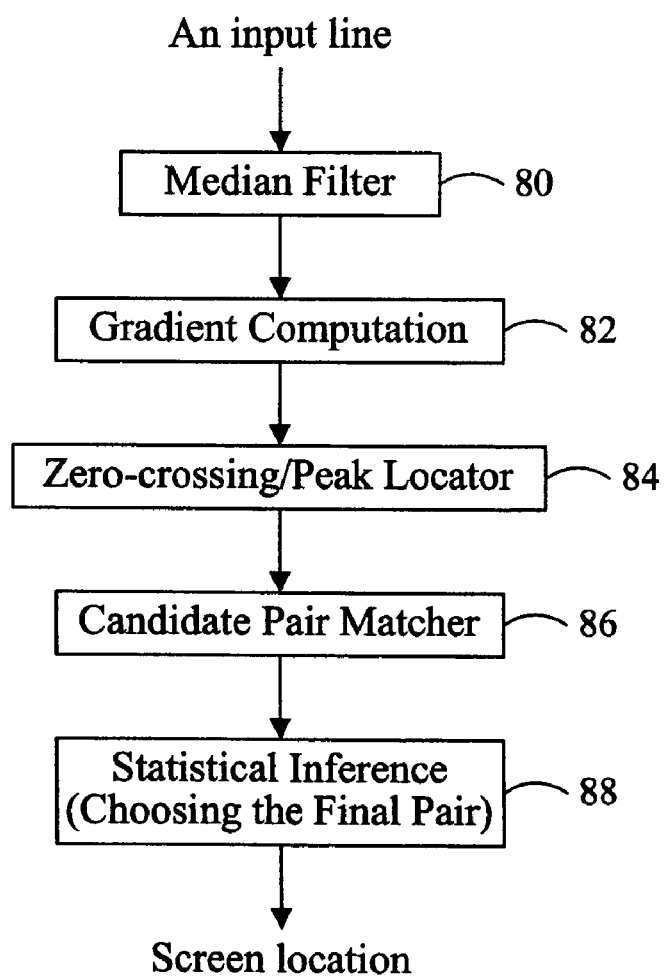
FIG. 10 illustrates image filtering.
Figure 11:
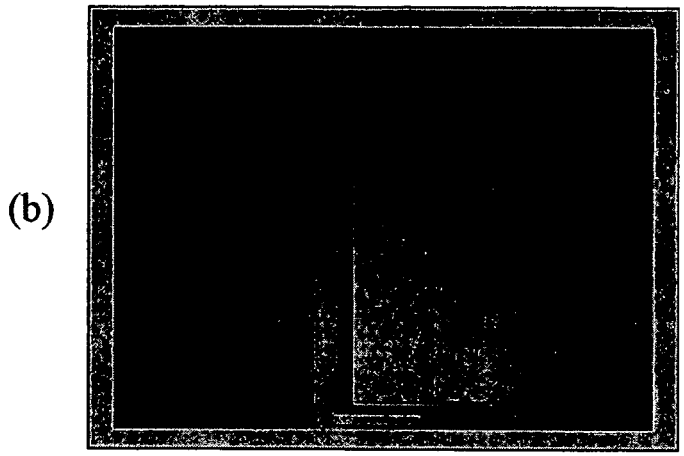
FIG. 11 illustrates a captured image.
Figure 11:
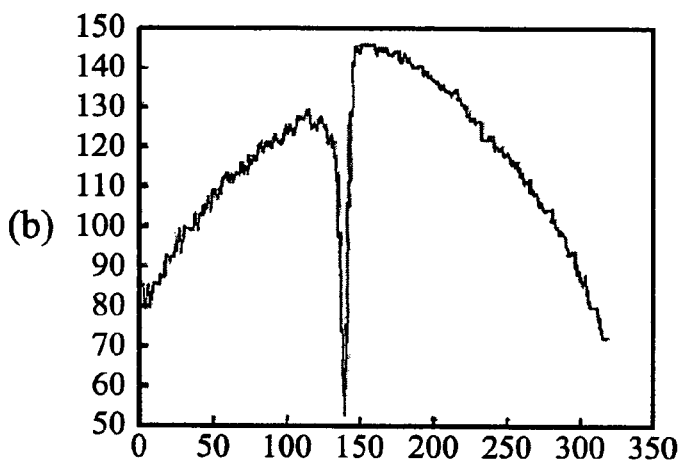
Figure 11:
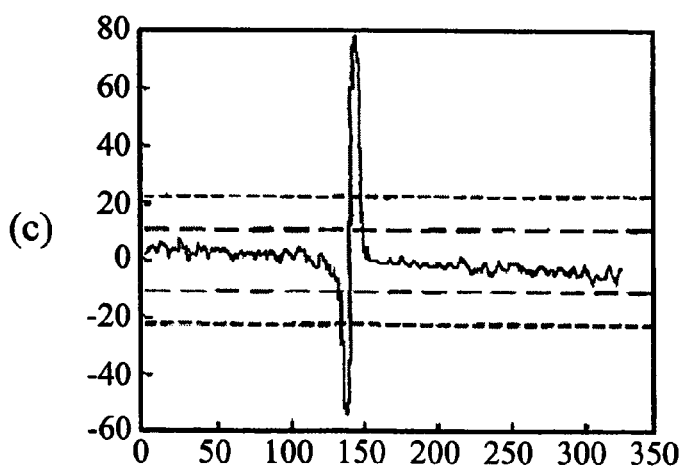

Referring to FIG. 10, one technique to detect the projection screen is to use a one-dimensional imaging sensor. An input data line is median-filtered 80 to remove noise since a typical inexpensive sensor captures data with significant noise level. The median filter is preferred due to its property of preserving discontinuity. The filtered data is then passed into a gradient computation module 82. It is noted that absolute luminance level is not the most reliable cue for identifying a screen, since there may be luminance variations due to shadows/shades as illustrated in FIG. 11. Thus the detection is preferably performed in the gradient domain. After the gradients are found, a zero-crossing/peak locator module 84 locates the zero-crossings and peaks in the gradient array. The zero-crossing/peaks are presumably the boundaries of the screen. Since typically there are multiple zero-crossings/peaks, and not all of them correspond to valid screen boundaries, the candidate pair matcher module 86 matches two zero-crossings/peaks to form a pair that is a plausible candidate of screen. The match is based on multiple criteria such as width of the screen, average brightness of the screen, etc. This module will obtain multiple such pairs. A statistical inference module 88 uses an inference algorithm to choose the most plausible pair, based on empirical probabilities that reflect the importance of each type of the cues used.

The basic principles of the above approach can be extended to the 2-D sensor case where the input array is 2-dimensional. In fact, one can even use the above 1-D approach to process the sensed 2-D array row by row, and then column by column. However, a preferred approach will also utilize the additional 2-D constraints such as that all 1-D screen boundaries in the horizontal direction should form two lines in the vertical direction. Alternatively, with 2-D data, one can start with edge detection, then perform line detection, and then extract a quadrilateral that encloses an area of relatively uniform color (white) and typically relatively brighter than the background. It is noted that the projection screen may be identified with one or more cameras.

After the detection of the projection screen an interactive technique may be used to permit the user to further adjust the aspect ratio, and/or keystone, if desired. These techniques may likewise be used to over-ride the automatic adjustments and also provide proper operation when the range of operation for the automatic methods is exceeded (e.g., in a very dark room). Such techniques should require minimal user interaction for ease of use. A "keystone adjustment pattern" is projected which the user interacts with via the laser pointer (or otherwise a pointing device) that is integrated with the projector remote control or separate from the projector, or alternatively by selecting the appropriate functions on the projector. The user starts and stops interactive adjustment on the basis of visual feedback by observing the dynamically changing shape of the keystone correction pattern in response to user's actions. In addition, after detection of the projection screen the system may, if desired, perform auto focus, auto centering (positioning), auto zooming, and auto keystoning, all without further user interaction with the projector. Also, after detection of the projection screen the system may perform auto centering (positioning) and/or auto zooming.

Figure 12:
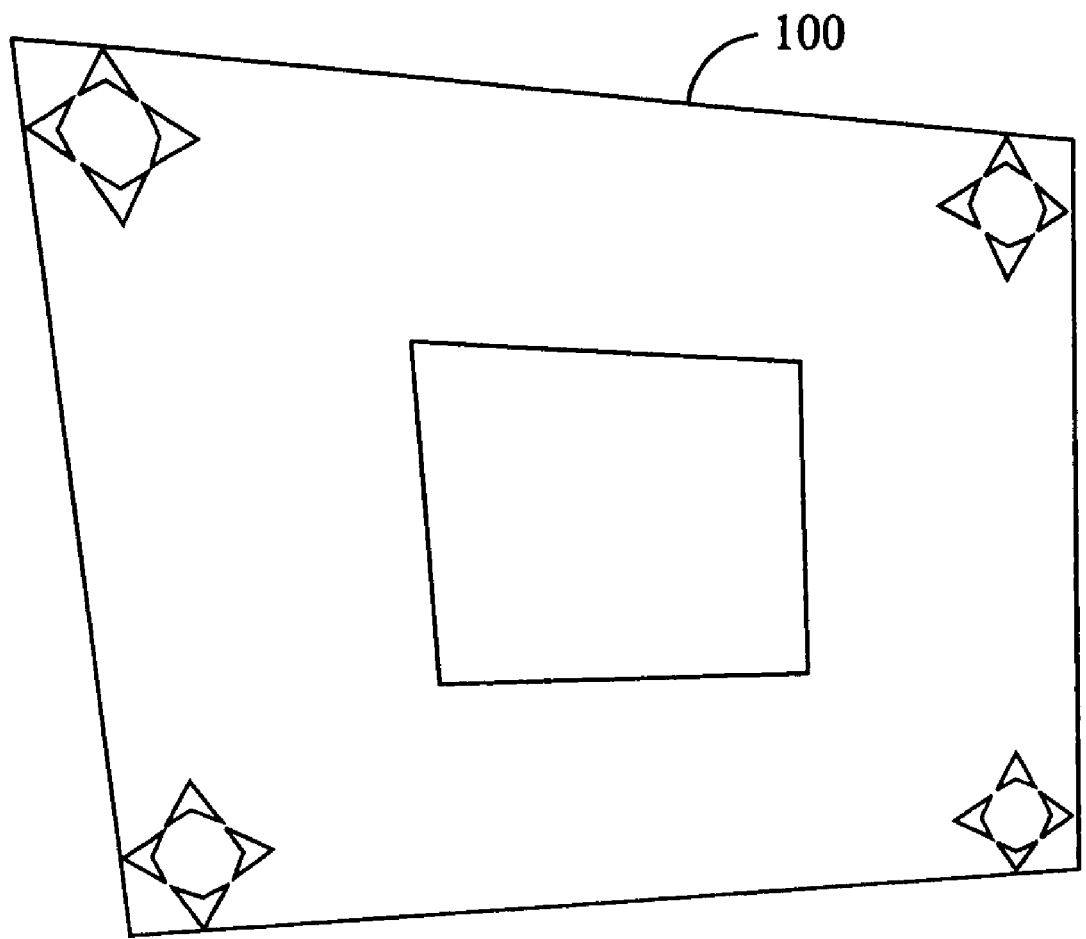
FIG. 12 shows an interactive keystone adjustment.

Referring to FIG. 12 a rectangular pattern may be used for interactive adjustment in the preferred embodiment. The pattern will appear as warped rectangle 100 when the keystone effect is present, and will appear to be perfectly (or substantially) rectangular when the keystone effect is corrected. At each one of its corners, the pattern has a cluster of 4 arrows, pointing north, south, west, and east directions. In one possible implementation, the user first enters the keystone adjustment mode by selecting the corresponding option in an on-screen menu, and then uses the laser pointer to adjust for keystone: whenever the laser beam falls on an arrow, the projection will be adjusted towards that direction. The camera detects the position of the laser and invokes the correction mechanism, which may be in the form of digital image pre-processing and/or optical/mechanical control of the projector imaging system. The laser pointer may be integrated into the projector remote control or otherwise be separate.

Figure 13:
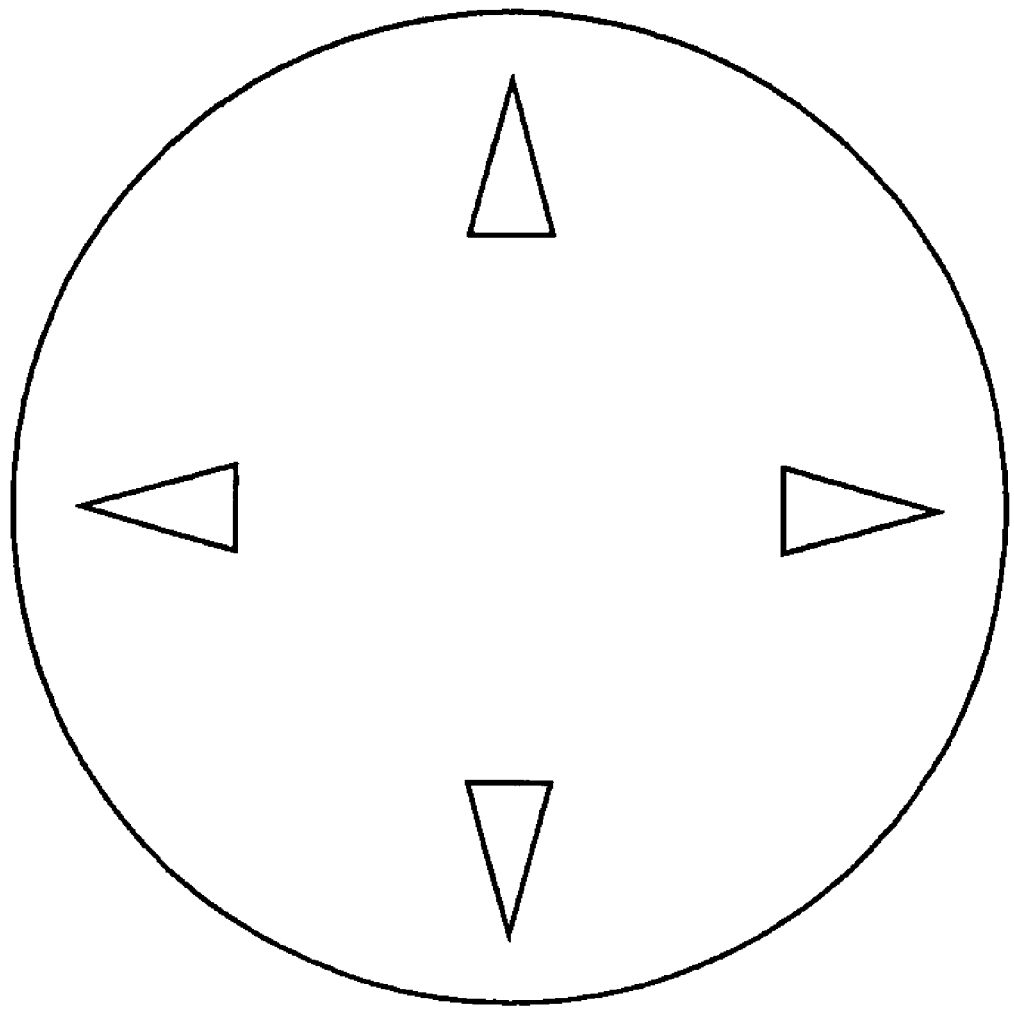
FIG. 13 shows a keypad.

In the preferred implementation, the user interacts with the arrows using the remote control unit of the projector, in particular using four-directional (pointing at N, S, W, and E) navigation arrows on a typical remote control, e.g., those on a circular directional pad. Such an ensemble of four arrows placed on a circular pad that can be pressed in 4 different directions is depicted in FIG. 13.

In this implementation, the user first enters the keystone adjustment mode by selecting the corresponding option on the on-screen display menu. The keystone adjustment pattern is then projected. Prior to adjustment, the user first selects one of the four corners that will be adjusted. There are many possible ways of making this selection. For example, the user makes a selection by pressing/clicking on a button on the remote control, or on a soft button on the on-screen display (henceforth the SELECT button). As the user presses the SELECT button, the four-arrow cluster appears on one particular corner signaling the fact that the corner is selected for adjustment. The user then selects any one of the four directions by pressing on the four corresponding directional arrows on the directional pad on the remote control unit (FIG. 13). After the adjustment is completed, when the user presses/clicks on the SELECT button, the next corner is selected. This is signaled to the user by the appearance of the four-arrow cluster at the next selected corner. By pressing the SELECT button repeatedly, the user can jump from one corner to the next in clockwise fashion. When a corner is selected, the four-arrow cluster appears on that corner to provide visual confirmation to the user. The remaining three corners do not have the four-arrow cluster.

A similar paradigm to the one described above can be used for interactive aspect ratio adjustment. Two arrows (up and down or left and right) placed on any appropriate part of the adjustment pattern are used to stretch and squeeze the image to interactively adjust for the correct aspect ratio.

In many cases there is no projection screen or otherwise a wall with discernable boundries that is used to display the image on. In this case, it is problematic to use a single imaging device in order to provide effective keystone correction. Accordingly, the system may use two or more imaging devices, such as two or more cameras, or one or more cameras together with the projector's optical system. The pair of optical sensing devices may be used to estimate the relative horizontal deviation angle and vertical deviation angle, typically using a projected test pattern, from which the keystone correction parameters may be estimated.

Figure 14:
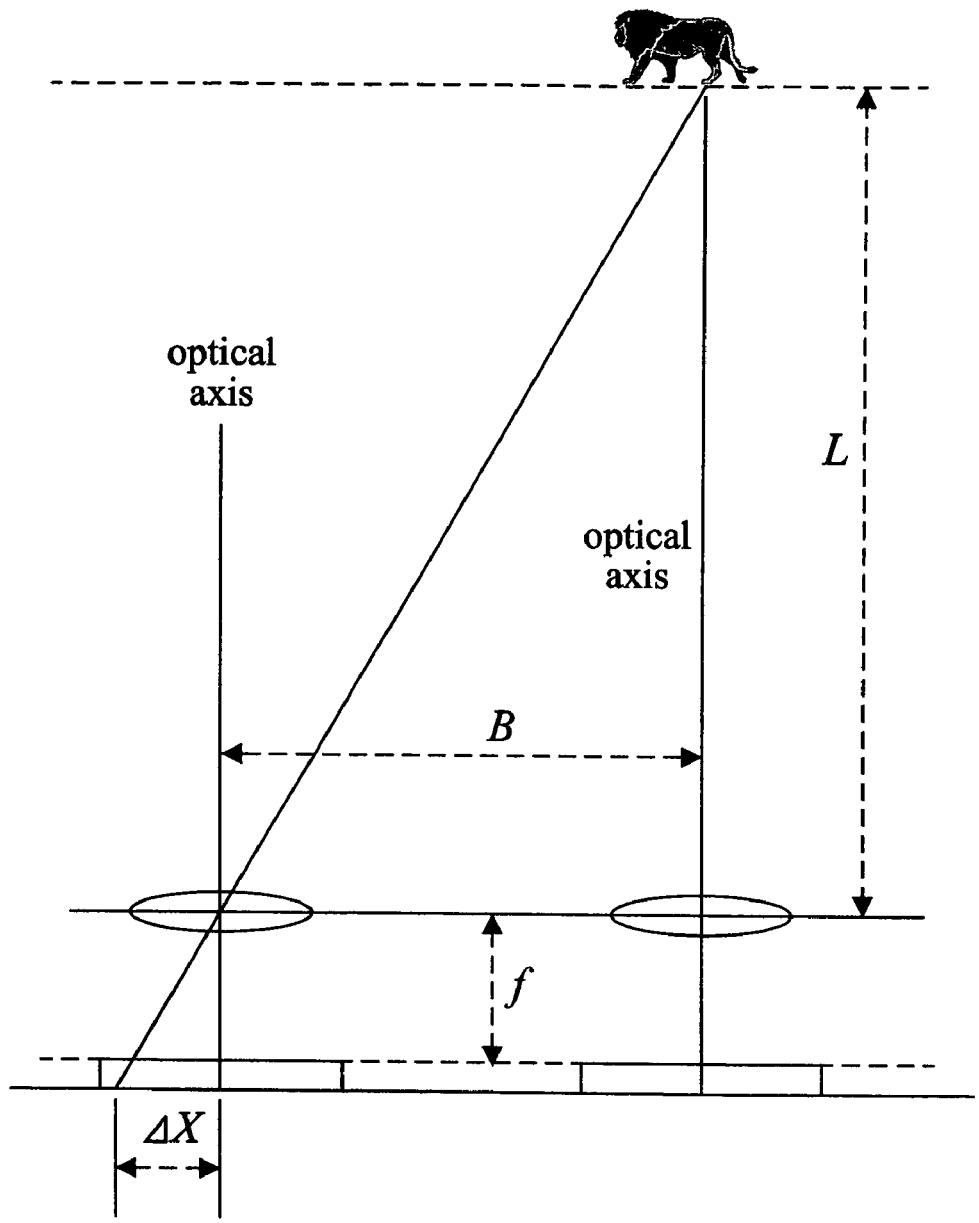
FIG. 14 illustrates the use of a second imaging source.

Depth to the projection surface is useful in estimating the relative projection surface orientation. The relative angles may be computed from the depth of the test patterns relative to the projector. While the use of a single sensor coupled with the projector optics is acceptable, it is difficult to obtain an accurate estimate of the distance from the projector to the display surface. In order to obtain a more accurate estimate of the distance from the projector to the display surface a depth-sensing device (e.g., a stereo camera), apart from the projector optics, may be used. In order to reduce expense, the depth sensing device may be a one-dimensional imaging sensor pair, if desired (such as illustrated in FIG. 14). The depth estimation may likewise be used to increase the accuracy of the projection screen detection module. Also, the system may place a constraint on the detected corners of the projection screen that they are co-planar, which is normally the case, in order to make the depth estimation more robust."

In another embodiment the imaging may use the projector optics (e.g., the projector lens) together with one or more other imaging devices. The imaging devices may be maintained in a fixed location with respect to the projector, and are preferably integral therewith. However, it has been determined that if the projector optics are adjusted in some manner during use, then the system needs to be re-calibrated for a new set of parameters to compensate for the zooming and/or focusing and/or lens shifting. To overcome this limitation, the present inventors determined that the system may pre-calibrate the optics of the projector so that the new parameters of the projector optics can be computed from the lens control parameters, as the lens is moved during zooming and/or focusing and/or lens shifting. The pre-calibration may include modeling the variations in the optical parameters as a function of one or more of the lens control parameters, so that the on-line re-calibration can be done automatically. The calibration may include calculations from pre-calibrations or otherwise a look-up table.

Figures 15, 16:
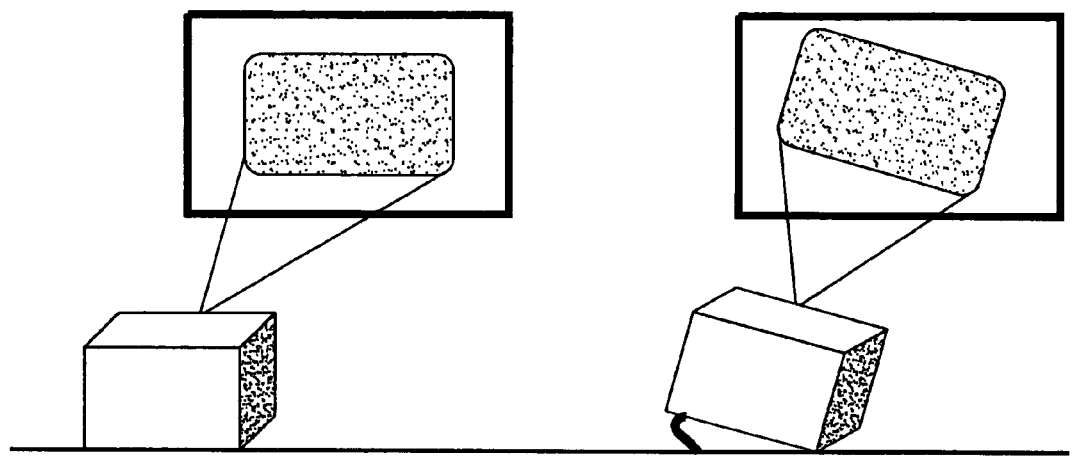
FIG. 15 shows projection roll.
FIG. 16 shows corrected projection roll.

Referring to FIG. 15, after keystone correction the projected image may be rectangular but it is not necessarily properly oriented with respect to the user, which typically desires the top and bottom edges to be horizontal, and the right and left edges to be vertical. In some embodiments the detected projection screen, or parts thereof, may be used as a basis to correct for projection roll so that the projector will be aligned with the real world, as illustrated in FIG. 16.

All references cited herein are hereby incorporated by reference.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A method for determining the location of a screen by a projector, comprising:
   (a) said projector receiving an image of a potential said screen;
   (b) said projector performing a median filter operation on said image;
   (c) said projector performing a gradient operation on said image;
   (d) said projector performing a zero-crossing operation on said image to determine edge screen candidates;
   (e) said projector matching pairs of said edge screen candidates;
   (f) said projector using statistical inference to select said matching pairs for said location of said screen.

2. The method of claim 1 wherein steps (a), (b), (c), (d), (e), and (f) are performed in the order of steps (a), (b), (c), (d), (e), and (f).

3. The method of claim 1 wherein said location is relative to said projector.

4. The method of claim 1 wherein said image is received by an imaging device.

5. The method of claim 4 wherein said imaging device includes a one-dimensional sensor.

* * * * *

UNITED STATES PATENT AND TRADEMARK OFFICE
CERTIFICATE OF CORRECTION

PATENT NO.       : 7,237,907 B2
APPLICATION NO.  : 11/642608
DATED            : July 3, 2007
INVENTOR(S)      : Baoxin Li et al.

Page 1 of 1

It is certified that error appears in the above-identified patent and that said Letters Patent is hereby corrected as shown below:

Column 6, Line 31 "boundries" should be --boundaries--
Column 6, Line 59 delete end quote Signed and Sealed this Thirteenth Day of November, 2007

JON W. DUDAS
*Director of the United States Patent and Trademark Office*